(12) United States Patent
Lelic et al.

(10) Patent No.: US 6,943,937 B2
(45) Date of Patent: Sep. 13, 2005

(54) OPTICAL AMPLIFIER PERFORMANCE CONTROLLER AND METHOD OF USE

(75) Inventors: Muhidin A. Lelic, Horseheads, NY (US); Anthony Sebastian Bauco, Horseheads, NY (US); Naresh Menon, Corning, NY (US); Ray Lin Ju, Painted Post, NY (US); David R. Peters, Corning, NY (US)

(73) Assignee: Avanex Corporation, Fremont, CA (US)

( * ) Notice: Subject to any disclaimer, the term of this patent is extended or adjusted under 35 U.S.C. 154(b) by 358 days.

(21) Appl. No.: 09/860,021

(22) Filed: May 17, 2001

(65) Prior Publication Data

US 2002/0171917 A1 Nov. 21, 2002

(51) Int. Cl.[7] .................................................. G01S 3/00
(52) U.S. Cl. .............................. 359/337.11; 359/341.3; 359/341.41; 359/341.42
(58) Field of Search .......................... 359/337.11, 341.3, 359/341.41, 341.42

(56) References Cited

U.S. PATENT DOCUMENTS

| | | | |
|---|---|---|---|
| 5,117,196 A | 5/1992 | Epworth et al. | ............ 359/333 |
| 5,664,131 A | 9/1997 | Sugiya | ........................ 359/341 |
| 5,737,118 A | 4/1998 | Sugaya et al. | .............. 359/341 |
| 5,859,938 A | * 1/1999 | Nabeyama et al. | ........... 385/24 |
| 5,900,968 A | 5/1999 | Srivastava et al. | .......... 359/341 |
| 5,909,305 A | 6/1999 | Kinoshita | .................... 359/341 |

(Continued)

FOREIGN PATENT DOCUMENTS

| | | | |
|---|---|---|---|
| EP | 0 805 571 A2 | 5/1997 | ............ H04J/14/02 |
| JP | 8-307161 | * 11/1996 | |

OTHER PUBLICATIONS

Haruo Okamura; "Automatic Optical Loss Compensation with Erbium–Doped Fiber Amplifier"; Journal of Lightwave Technology, vol. 10, No. 8, Aug. 1992; pp. 1110–1116; IEEE 1992.

Dwight H. Richards, Janel L. Jackel, Senior Member, IEEE, and Mohamed A. Ali; A Theoretical Investigation of Dynamic All–Optical Automatic Gain Control in Multichannel EDFA's and EDFA Cascades; IEEE Journal of Selected Topics in Quantam Electronics, vol. 3, No. 4, Aug. 1997; pp. 1027–1036; IEEE 1997.

A. K. Srivastava, J.L. Zyskind, Y. Sun, J. Ellson, G. Newsome, R. W. Tkach, A. R. Chraplyvy, J. W. Sulhoff, T. A. Strasser, C. Wolf, and J. R. Pedrazzani; "Fast–Link Control Protection of Survising Channels in Multiwavelength Optical Networks"; IEEE Photonics Technology Letters, vol. 9, No. 12, Dec. 1997; pp. 1667–1669.

Seo Yeon Park, Hyang Kyun Kim, Gap Yeol Lyu, Sun Mo Kang, and Sang–Yung Shin; "Dynamic Gain and Output Power Control in a Gain–Flattened Erbium–Doped Fiber Amplifier"; IEEE Photonics Technology Letters, vol. 10, No. 6, Jun. 1998; pp. 787–789.

(Continued)

*Primary Examiner*—Mark Hellner
(74) *Attorney, Agent, or Firm*—Moser, Patterson & Sheridan, LLP

(57) ABSTRACT

A controller for an optical amplifier and a method for controlling an optical amplifier are disclosed. The illustrative method includes inputting a set-point to a controller; receiving a portion of an input signal; receiving a portion of an output signal from a first amplifier stage; receiving a portion of an output signal from an attenuation stage; receiving a portion of an output signal from a second amplifier stage and adjusting the first amplifier stage, the second amplifier stage and the attenuation stage based on the received portions to substantially maintain the set-point.

47 Claims, 9 Drawing Sheets

U.S. PATENT DOCUMENTS

| | | | |
|---|---|---|---|
| 5,940,208 A | | 8/1999 | Blaszyk et al. ............. 359/341 |
| 5,986,799 A | | 11/1999 | Itou et al. ................... 359/337 |
| 6,023,366 A | | 2/2000 | Kinoshita .................... 359/341 |
| 6,025,947 A | | 2/2000 | Sugaya et al. .............. 359/160 |
| 6,038,063 A | | 3/2000 | Tsuda et al. ................ 359/341 |
| 6,049,413 A | * | 4/2000 | Taylor et al. ............... 359/337 |
| 6,055,092 A | | 4/2000 | Sugaya et al. .............. 359/337 |
| 6,057,959 A | * | 5/2000 | Taylor et al. ............... 359/341 |
| 6,069,731 A | * | 5/2000 | Bayart ........................ 359/341 |
| 6,108,123 A | | 8/2000 | Kinoshita .................... 359/337 |
| 6,111,688 A | | 8/2000 | Kobayashi et al. .......... 359/341 |
| 6,144,486 A | | 11/2000 | Bennett et al. ............. 359/341 |
| 6,151,157 A | | 11/2000 | Ball et al. .................... 359/341 |
| 6,151,158 A | * | 11/2000 | Takeda et al. .............. 359/341 |
| 6,160,659 A | | 12/2000 | Kinoshita .................... 359/337 |
| 6,163,399 A | | 12/2000 | Berg ........................... 359/341 |
| 6,166,850 A | | 12/2000 | Roberts et al. ............. 359/341 |
| 6,178,037 B1 | * | 1/2001 | Sugaya et al. .............. 359/341 |
| 6,198,571 B1 | | 3/2001 | Yang ........................... 359/337 |
| 6,201,636 B1 | | 3/2001 | Noda ........................... 359/337 |
| 6,215,581 B1 | | 4/2001 | Yadlowsky .................. 359/337 |
| 6,215,584 B1 | | 4/2001 | Yang et al. .................. 359/341 |
| 6,219,162 B1 | | 4/2001 | Barnard et al. ............. 359/124 |
| 6,246,514 B1 | * | 6/2001 | Bonnedal et al. ........... 359/341 |
| 6,259,553 B1 | | 7/2001 | Kinoshita .................... 359/337 |
| 6,275,330 B1 | | 8/2001 | Izumi .......................... 359/341 |
| 6,282,017 B1 | | 8/2001 | Kinoshita .............. 359/341.42 |
| 6,288,836 B1 | | 9/2001 | Kawasaki et al. ..... 359/341.42 |
| 6,377,394 B1 | * | 4/2002 | Drake et al. ........... 359/341.41 |
| 6,377,396 B1 | * | 4/2002 | Sun et al. .............. 359/341.42 |
| 6,417,965 B1 | * | 7/2002 | Ye et al. ................ 359/341.41 |
| 6,424,458 B1 | * | 7/2002 | Cornelius et al. ........ 359/341.4 |
| 2001/0033413 A1 | | 10/2001 | Lelic et al. ............... 359/341.4 |
| 2002/0176156 A1 | | 11/2002 | Zahnley et al. .......... 359/341.4 |
| 2002/0186460 A1 | | 12/2002 | Lelic ....................... 359/341.4 |

OTHER PUBLICATIONS

Patent Abstracts of Japan, Nippon, 09219696, Aug. 19, 1997, Optical Amplifier.

H. Suzuki, No. Takachio, O. Ishida, and M. Koga; "Dynamic Gain Control by Maximum Signal Power Channel in Optical Linear Repeaters for WDM Photonic Transport Networks"; IEEE Photonics Technology Letters, vol. 10, No. 5, May 1998; pp. 734–736.

H. Suzuki, N. Takachio, O. Ishida and M. Koga; "Power Excursion Suppression in Cascades of Optical Amplifiers with Automatic Maximum Level Control"; IEEE Photonics Technology Letters; vol. 11, No. 8, Aug. 1999; pp. 1051–1053.

Hosung Yoon, Sungho Bae, Seong Joon Ahn, and Namkyoo Park; "Reference Level Free Multichannel Gain Equalization and Transient Gain Suppression of EDFA with Differential ASE Power Monitoring"; IEEE Photonics Technology Letters, vol. 11, No. 3, Mar. 1999; pp. 316–318.

H. Suzuki, N. Takachio, O. Ishida, and M. Koga; "Power Excursion Suppression in Cascades of Optical Amplifiers with Automatic Maximum Level Control"; IEEE Photonics Technology Letters, vol. 11, No. 8, Aug. 1999; pp. 1051–1053.

* cited by examiner

Gain Profile

◇ Pin=0.5 dBm, G=10 dB
○ Pin=-10 dBm, G=23 dB

OPTICAL AMPLIFIER PERFORMANCE CONTROLLER AND METHOD OF USE

FIELD OF THE INVENTION

The present invention relates generally to optical amplifiers and more specifically to an optical amplifier performance controller and method of use.

BACKGROUND OF THE INVENTION

The increasing demand for high-speed voice and data communications has led to an increased reliance on optical communications, especially optical fiber communications. The use of optical signals as a vehicle to carry channeled information at high speed is preferred in many instances to carrying channeled information at other electromagnetic wavelengths/frequencies in media such as microwave transmission lines, coaxial cable lines, and twisted copper pair transmission lines. Advantages of optical media include higher channel capacities (bandwidth), greater immunity to electromagnetic interference, and lower propagation loss. In fact, it is common for high-speed optical systems to have signal rates in the range of approximately several megabits per second (Mbit/s) to approximately several tens of gigabits per second (Gbit/s), and greater. However, as the communication capacity is further increased to transmit greater amounts of information at greater rates over fiber, maintaining signal integrity can be exceedingly challenging.

The emergence of optical communications as a useful vehicle for short and long-haul data and voice communications has led to the development of a variety of optical amplifiers. One type of optical amplifier is the rare-earth element optical amplifier (rare-earth doped amplifier). One such rare-earth doped amplifier is based on erbium-doped silica fiber. The erbium doped fiber amplifier (EDFA) has gained great acceptance in the telecommunications industry. The erbium-doped fiber amplifier has a number of characteristics which make it an excellent amplifier for optical communications. These characteristics include polarization-independent gain, low interchannel cross-talk, wide optical bandwidth, and low-noise generation. In brief, the EDFA offers a useful way to compensate for signal propagation loses along high-speed fiber-optic links.

Erbium-doped fiber amplifiers (EDFA) are useful in a variety of optical transmission systems. One way to more efficiently use available resources in the quest for high-speed information transmission is known as multiplexing. One particular type of multiplexing is wavelength division multiplexing (WDM). In WDM, several information streams (voice and/or data streams) share a particular transmission medium, such as an optical fiber. Each high-speed information channel is transmitted at a designated wavelength along the optical fiber. At the receiver end, the interleaved channels are separated (de-multiplexed) and may be further processed by electronics. (By convention, when the number of channels transmitted by such a multiplexing technique exceeds approximately four, the technique is referred to dense WDM or DWDM). As WDM gains popularity, optical amplifiers may be required to give requisite signal boost to preserve signal quality, particularly in long-haul applications.

Typically, optical amplifiers used in WDM based systems must satisfy certain requirements. One of the requirements is that the gain of the amplifier over the operating spectrum is substantially flat with low gain tilt and a low noise figure. This requirement is often referred to as gain flatness. As can be appreciated, gain flatness is required to avoid the dominance of the power of one or more channels over the others.

Another requirement of the optical amplifier is good transient characteristics. This requirement is related to the sensitivity of the surviving signals present in the optical network to the adding or dropping of some other signals (channels). When additional channels are added, the total optical power may experience a large upward transient spike that may last up to a millisecond causing a temporary increase in the bit-error-rate (BER). If the channels are dropped, total optical power may experience a large downward transient spike. This may also increase (BER) due to effects such as receiver overload or some nonlinear phenomena, such as stimulated Brillouin scattering. In addition to the above described affects, the amplifier may exhibit a permanent shift in gain or an unwanted power offset.

To fulfill the above illustrative requirements, it is necessary to control the optical amplifier during operation. While control mechanisms and schemes have been incorporated in conventional optical amplifiers, they have shortcomings in deployed systems. To this end, conventional controllers lack the capability to control fast gain and output power transients. Control of these transients is useful in order to avoid cross-talk between the channels caused by the adding or dropping of channels, or by changing set-point values for the gain or output power in variable gain amplifiers.

Accordingly, what is need is a controller and its method of use which overcomes the drawbacks of conventional controllers described above.

SUMMARY OF THE INVENTION

According to an illustrative embodiment of the present invention, a method for controlling an optical amplifier is disclosed. The illustrative method includes inputting a set-point to a controller; receiving a portion of an input signal; receiving a portion of an output signal from a first amplifier stage; receiving a portion of an output signal from an attenuation stage; receiving a portion of an output signal from a second amplifier stage and adjusting the first amplifier stage, the second amplifier stage and the attenuation stage based on the received portions to substantially maintain the set-point.

According to another illustrative embodiment of the present invention, an optical amplifier includes a controller which receives a portion of an input signal, a portion of an output signal from a first amplifier stage, a portion of an output signal from an attenuation stage, and a portion of an output signal from a second amplifier stage. The controller adjusts the first amplifier stage, the attenuation stage, and the second amplifier stage based on the received portions of the signals.

Defined Term

As used herein, "signal" means the optical signal plus any noise present. For example, "input signal" means the input optical signal plus any noise present.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

In the following detailed description, for purposes of explanation and not limitation, exemplary embodiments disclosing specific details are set forth in order to provide a thorough understanding of the present invention. However, it will be apparent to one having ordinary skill in the art that the present invention may be practiced in other embodiments that depart from the specific details disclosed herein. In other instances, detailed descriptions of well-known devices and methods may be omitted so as not to obscure the description of the present invention.

Figure 1:
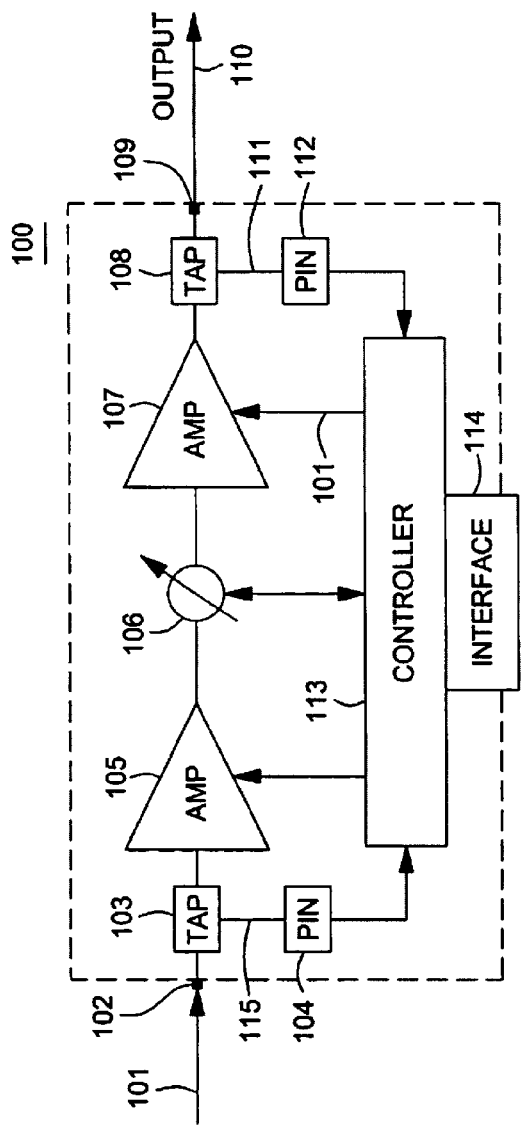
FIG. 1 is a block diagram of an optical amplifier including a controller in accordance with an illustrative embodiment of the present invention.

Turning to FIG. 1, an optical amplifier 100 is shown. An input signal 101 is input to an input port 102. A portion 115 of the input signal 101 is branched off via a first tap 103. This portion of the input signal 101 is incident upon a photodetector 104, illustratively a PIN photodetector. The remainder of the input signal 101 is input to a first amplifier stage 105. Upon amplification at the first optical amplifier stage 105 a variable optical attenuator (VOA) 106 selectively attenuates the optical signal. The output from the variable optical attenuator 106 is input to a second optical amplifier stage 107. A portion 111 of the output of the second optical amplifier stage 107 is branched off via a second tap 108. The remainder of the input signal 101 is output via output port 109 and an output signal 110 is further transmitted in the optical communication system (not shown). Portion 111 is incident upon a second photodetector 112, illustratively a PIN photodetector. The first photodetector 104 and the second photodetector 112 convert the received portions 115 and 111 into electrical signals which are input to a controller 113.

Illustratively, the optical amplifier 100 according to the exemplary embodiment of FIG. 1 is a two-stage variable gain amplifier. As is well known, optical amplifiers often include multiple stages. The use of multiple stages, among other reasons, is advantageous because it enables signal amplification without over-driving the amplifier. Ultimately, this enables the requisite amplification while maintaining signal quality. It is of interest to note that for the purposes of clarity of discussion, a two-stage optical amplifier is illustrated. Of course, the present invention may be used with optical amplifiers having more than two stages as well as cascaded two-stage (or more) optical amplifiers. In addition the controller and method of the present invention may also include the capability to compensate for amplified stimulated emission (ASE) as well as other sources of noise in a signal. Finally, while the optical amplifier is illustratively an EDFA, the controller and method of the present invention may be used to control other amplifiers to include Raman fiber amplifiers (RFA).

The optical amplifier 100 may operate in gain-control mode, output power control mode or pump current control mode. In gain-control mode, controller 113 controls the first amplifier stage 105, the variable optical attenuator 106, and the second optical amplifier stage 107, so that the gain of the optical amplifier 100 is equal to a predetermined set-point value ($G_{sp}$). In output power control mode, the controller 113 controls the first optical amplifier stage 105, the variable optical attenuator (VOA) 106, and the second optical amplifier stage 107, so that the output power of output signal 110 is substantially constant and equal to a predetermined set-point value ($P_{sp}$). In pump control mode, the controller 113 keeps the power of the amplifier pumps (not shown) at predetermined levels by maintaining the current that controls the pumps at a constant level ($I_{sp}$). The desired control mode as well as other desired input parameters may be input via communication interface 114, which may be an RS-232 or other suitable interface.

Whether the optical amplifier 100 is operating in gain-control mode, output control mode, or pump current control mode, the controller 113 samples input signal 101 via the first photodetector 104 and output signal 110 via the second photodetector 112. Through receipt of these electronic representations of the input signal 101 and the output signal 110, the controller 113 makes any necessary adjustments to maintain either the gain set-point value, the output power set-point value or the pump current set-point value.

As explained in further detail in connection with exemplary embodiments described below, the controller 113 commands the first optical amplifier stage 105, the variable optical attenuator 106 and the second optical amplifier stage 107 to substantially maintain a desired set-point value across a dynamic range of optical amplifier 100. The command given to each of these elements by the controller 113 is based upon the input from the first photodetector 104 and the second photodetector 112. To this end, upon receiving the input from the first photodetector 104 and the second photodetector 112, the required level of amplification is commanded by the controller 113 to the first and the second optical amplifier stages 105 and 107, respectively. Likewise, the required level of attenuation is commanded by the controller 113 to the variable optical attenuator 106.

Illustratively, the required levels of attenuation and amplification commanded by the controller 113 are predetermined experimentally. The controller 113 may include a processor (e.g. a microprocessor) to properly calculate the required input to the first and second optical amplifier stages 105 and 107, respectively, as well as the required attenuation of the variable optical attenuator 106. Alternatively, this experimental data may be stored in a look-up table(s), and the controller 113 may be adapted to retrieve the particular required amplification and attenuation inputs for a given level of input signal 101 and set-point value. Again, the set-point value may be gain, output power or pump current. Finally, controller 113 may command first and second amplification stage s105 and 107, respectively, and variable optical attenuator 106 through a combination of calculations and look-up table values.

By virtue of the ability of the controller 113 to control the first and second optical amplifier stages 105 and 107 as well as the variable optical attenuator 106 for a variety of desired output parameters, the controller 113 is useful in controlling an amplifier such as optical amplifier 100, which may be a variable gain amplifier. Alternatively, the optical amplifier 100 may be a set gain amplifier. The controller 113 is capable of controlling fast-gain and output power transients by virtue of either the referenced method, look-up table or a combination thereof. The ability to control fast-power and output power transients is useful in the avoidance of cross-talk between channels caused by adding or dropping of some of the channels, or by the change of set-point values for gain or output power in a variable optical amplifier.

Illustratively, the controller 113 performs control calculations and/or retrieves data via a look-up table, at speeds between approximately 200 kHz and approximately 1 Mhz in the case of an EDFA. (Approximately 200 kHz if the optical amplifier is a RFA). The control calculations and/or look-up table values may be implemented via one or more processors. These processors are illustratively digital signal processors well known to one having ordinary skill in the art. Moreover, the controller 113 of the illustrative embodiment shown in FIG. 1 enables a relatively flat gain spectrum across an operating spectrum of the amplifier. Moreover, the controller 113 ensures gain tilt and gain ripple that are in a pre-specified acceptable range.

The invention of the present disclosure may be more fully understood through exemplary embodiments described in the examples which follow. Of course, these examples are meant to be illustrative of the present invention and are in no way limiting of the invention as set forth in the appended claims or the legal equivalents thereof.

EXAMPLE I

Figure 2:
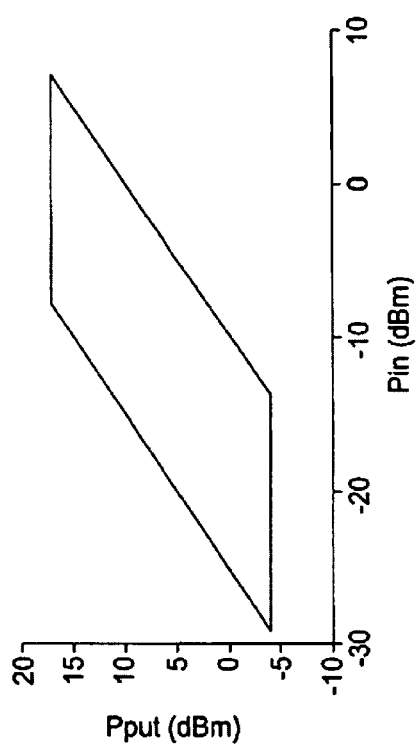
FIG. 2 is a block diagram of an optical amplifier including a controller in accordance with an illustrative embodiment of the present invention.
Figure 2A:
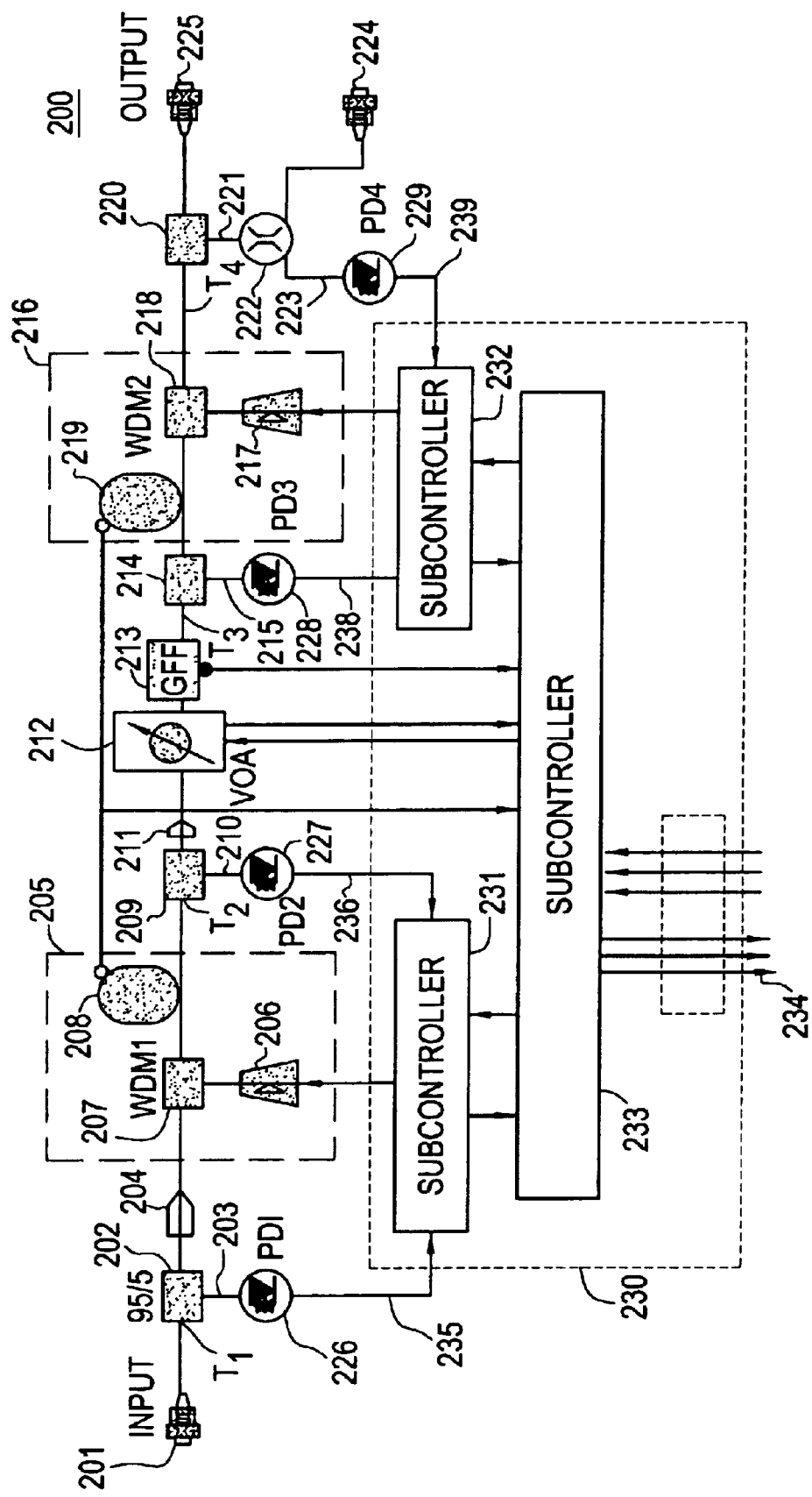

Turning to FIG. 2(a), an optical amplifier 200 according to an exemplary embodiment of the present invention is shown. An input signal from an optical communications system is received at input port 201. At point $T_1$, an optical tap 202, illustratively a 95/5 tap, branches off a portion 203 of the input signal 201. The remainder of the input signal is incident upon a first optical isolator 204. The first optical isolator 204 is a standard isolator and is used to reduce optical back-reflections, which may degrade the amplifier gain performance and increase noise generation. The output from the first optical isolator 204 is incident upon a first optical amplifier stage 205.

The first optical amplifier stage 205 is illustratively a rare-earth-doped fiber amplifier, which includes a first optical pump 206, a first wavelength division multiplexer 207 and a section of rare-earth doped fiber 208, which may be a coil of a of rare-earth fiber of a particular length to achieve a particular level of gain. The first optical pump 206 is an energy source (e.g. a laser) which delivers optical power to create the desired level of inversion for a particular level of gain. The first wavelength division multiplexer 207 serves to efficiently couple the signal from the first optical isolator 204 and the pump light into, or away from the rare-earth doped fiber 208. Illustratively, the rare-earth dopant is trivalent erbium, and the illustrative pump wavelength is 980 nm.

The output signal from the first amplifier stage 205 is input to a second tap 209 at point $T_2$. A portion 210 of the output of the first optical amplifier stage 205 is branched off by the second tap 209 (illustratively a 98/2 tap), while the remainder of the output from the first optical amplifier stage 205 is input to a second optical isolator 211. The output from the second optical isolator 211 is incident upon a variable optical attenuator (VOA) 212. After a pre-determined degree of attenuation by VOA 212, the signal is incident upon a gain flattening filter 213. The output of the gain flattening filter 213 is incident upon a third optical tap 214 (again, illustratively a 98/2 tap). A portion 215 of the signal is branched off by the third optical tap 214 at a point $T_3$. The remainder of the signal is incident upon a second optical amplifier stage 216.

The second optical amplifier stage 216 is illustratively an erbium-doped fiber amplifier similar to first optical amplifier stage 205. As such, the second optical amplifier stage 216 includes a second optical pump 217, a second wavelength division multiplexor 218 and a second rare-earth doped fiber 219.

The output from the second optical amplifier stage 216 is then incident upon a fourth optical tap 220 illustratively a 98/2 tap. A portion 221 of the amplified signal is branched off by the fourth optical tap 220 at a point $T_4$, and the remainder of the amplified signal is output to the rest of the optical communication system via output port 225. As alluded to above, the optical amplifier may be cascaded. As such, the output port 225 could be connected to an input port of another optical amplifier (not shown). Moreover, the optical amplifier is illustratively a two-stage amplifier. Of course, the controller 113 could adapted for use with an optical amplifier having more than two stages.

As shown, a coupler 222, illustratively a 50/50 coupler splits the portion 221 and a portion of the split signal is output to a monitoring port 224. Another portion 223 is incident on a fourth photodetector 229, and provides a sampling of the output signal at output port 225. The portions 203, 210, 215 and 223 are used to achieve the control of the optical amplifier 200. To this end, portion 203 of the input signal is branched off and is incident upon a first photodetector 226. The photodetector 226 converts the optical signal to an electrical signal 235, which is input to the controller unit 230. Similarly, portion 210 of the output of the first optical amplifier stage 205 is incident upon a second photodetector 227. The output of second photodetector 227 is second electrical signal 236 which is input to the controller unit 230. Portion 215 of the attenuated output signal is incident upon a third photodetector 228. The photodetector 228 outputs an electrical signal 238 which is input to the controller unit 230. Portion 223, which is a portion of the output signal from the second optical amplifier stage 216 is incident upon a third photodetector 229. Electrical signal 239 is output from third photodetector 229 and is input to the controller unit 230.

As described, electrical signal 235 is representative of the input signal at point $T_1$. Electrical signal 236 is representative of the signal after amplification at the first optical amplifier stage 205 (point $T_2$). Electrical signal 238 is representative of the signal after attenuation by the variable optical attenuator 212. Moreover, electrical signal 238 is representative of the flatness of the gain spectrum since after attenuation by the VOA 212, the signal is input to gain flattening filter 213. Finally, electrical signal 239 is representative of the output signal after amplification at the second optical amplifier stage 216 (point $T_4$). As described in further detail herein, these four inputs to controller unit 230 are used along with desired set-point parameters to control the optical amplifier 200.

The optical amplifier 200 usefully functions in gain-control, output power control or pump control mode. As such, a particular value of gain, output power or pump current is maintained by the controller unit 230. To maintain the desired set-point of gain, output power or pump current during the adding and/or dropping of signals in a typical WDM or DWDM system, it is advantageous to preserve gain flatness with low ripple and little gain tilt over a prescribed spectrum. This may be accomplished using the illustrative controller 230 of the exemplary embodiment of FIG. 2(a) by controlling the set-point of the first optical amplifier stage 205; controlling the set-point of the variable optical attenuator 212; and controlling the second optical amplifier stage 216. Moreover, in the illustrative embodiment of FIG. 2(a), the first optical amplifier stage 205 is controlled by a first subcontroller 231, the second optical amplifier stage 216 is controlled by a second subcontroller 232, and the variable optical attenuator 212 may be controlled by a third subcontroller 233.

In gain-control mode, first subcontroller 231 adjusts the power of first optical pump 206 such that the average gain of the rare-earth doped fiber 208 is equal to a prescribed set-point value, $G_{sp1}$ (where the average gain is defined as the ratio of the optical power at the output of the coil to the optical power at the input of the coil). Likewise, second subcontroller 232 adjusts the power of the second optical pump 217 such that the average gain of second rare-earth doped fiber 219 is equal to a prescribed set-point value, $G_{sp2}$. Finally, the third subcontroller 233 sets the level of attenuation ($G_{VOA}$) for a particular desired gain set-point of the signal at output 225.

In output power-control mode, the laser pump power may be adjusted such that the optical power at the output of the first and second optical amplifier stages, 205 and 216, respectively, are maintained at constant levels and equal to respective power set-point values, $P_1$ and $P_2$, respectively.

In pump-control mode, first and second subcontrollers 231 and 232, respectively, maintain the power of respective first and second optical pumps 206 and 217 at pre-specified levels by keeping the current that controls the first and second optical pumps at constant levels, $I_1$ and $I_2$, respectively.

First and second subcontrollers 231 and 232, respectively, may be considered first-level controllers and generally perform calculations and issue control commands that are time sensitive. Third subcontroller 233 is a second-level controller that issues controller commands that are generally not as time critical as those handled by first and second subcontrollers 231 and 232, respectively. These tasks include performance monitoring, command processing, and control of the variable optical attenuator (VOA) 212. Finally, a high level controller (not shown) may be effected by a user-interface connected at controller interface 234. This high level controller is illustratively a graphical user-interface (GUI) based interface controller. This interface is illustratively a command and supervisory interface. The illustrative GUI may be used for monitoring and control of amplifier. A user may define modes of control (e.g. gain, output power, pump current) and enter desired set-points; illustratively, gain set-point. The set-point values and actual values of the control parameters are displayed for the user. In addition, various monitoring variables (e.g. optical signal powers at different points of the amplifier, pump currents, unit temperature, and alarms) are available and displayed.

For purposes of ease of discussion, the optical amplifier 200 according to the exemplary embodiment of FIG. 2(a) is set to operate in gain-control mode. Once gain-control mode is selected at the GUI interface controller, the user enters a desired set-point gain for the amplifier 200. An illustrative control method described herein determines the required gain of the rare-earth doped fiber 208, the required gain of second rare-earth doped fiber 219, and the attenuation level of variable optical attenuator 212. These values are then sent to first, second and third subcontrollers 231, 232 and 233, respectively. First subcontroller 231 adjusts the power of first optical pump 206, second subcontroller 232 adjusts the power of second optical pump 217, and third subcontroller 233 adjusts the attenuation level of the VOA to its set-point value.

An exemplary method described presently is a method that may be used within the GUI interface controller for gain-control mode. Similar methods may be derived for other control modes, or a combination of different control modes for each stage of optical amplifier 200.

Exemplary Method I (Gain-Control Mode)
Step 1. Select the gain-control mode.
Step 2. Enter the set-point gain for the module, $G_{sp}$.
Step 3. Based on the optical powers at points T1, T2, T3, T4, calculate the gain set-point, $G_{1sp}$, for the first optical amplifier stage, gain set-point $G_{2sp}$ for the second optical amplifier stage and set-point attenuation, $G_{VOASP}$, of VOA 212. Send these values to the controller at second level.

The set-point values $G_{1sp}$, $G_{2sp}$ and $G_{VOASP}$ can be calculated in a variety of ways. For example, the values may be interpolated form a two-dimensional look-up table. Alternatively, equations may be derived for a specific set of operating points and gain mask. By either technique, experimental data is used to determine the required set-points of first optical pump 206, second optical pump 217 and VOA 212 for a desired gain-set-point at output 225. Moreover, these experimentally determined set-points usefully maintain a substantially flat gain spectrum with well controlled gain tilt and ripple. Illustratively, optical amplifier 100 may be controlled to operate with substantially flat gain across its operating spectrum. For example, optical amplifier 100 may be designed to operate within a gain mask, which is a graph of lines of constant gain, such as that shown in FIG. 2(b). This will result in a substantially flat gain spectrum.

An illustrative technique for calculation of set-points is described presently. The present method is generalized for a group of fiber coils, VOA, gain flattening filter ($G_{ff}$ described herein) and gain mask. Based on a particular gain set-point, $G_{sp}$, and measure input power of electrical signal 235, the power levels at the output of first optical amplifier stage 205, VOA 212 and second optical amplifier stage 216 may be set through the control of first optical pump 206, VOA 212 and second optical pump 217. Because the output power of first optical amplifier stage 205 depends upon the input power of the input signal 201, the output power of first optical amplifier stage 205 should be set by controlling the first optical pump 206.

The optical power $P_2$ at point $T_2$ is a non-linear function of the input power $P_1$ at $T_1$ and the gain set-point $G_{sp}$:

$$P_2 = f_2(P_1, G_{sp}) \quad (1)$$

usefully this dependence may be expressed as:

$$P_2 = a_1(P_1)^2 + a_2(P_2)^2 + a_3 \quad (2)$$

where $a_1$, $a_2$, and $a_3$ are coefficients determined for a particular amplifier and particular gain mask.

The power at the output of the variable optical attenuator 212 may be set by controlling the VOA 212, and is a function of the input power optical signal 201 and of the gain set-point $G_{sp}$. Mathematically, the optical power $P_3$ at point $T_3$ is a non-linear function of the input power $T_1$ and gain set-point $G_{sp}$:

$$P_3 = f_3(P_1, G_{sp}) \quad (3)$$

usefully this dependence can be expressed in the form:

$$P_3 = b_1(P_1)^2 + b_2 P_1 + b_3 \quad (4)$$

where $b_1$, $b_2$ and $b_3$ are coefficients determined for particular optical amplifier and gain mask.

Finally, after the output power of the first optical amplifier 205 and the VOA 212 have been set, the output power of output signal 225 may be adjusted by controlling the second optical pump 217 of the second optical amplifier stage 216. Mathematically, optical power $P_4$ point $T_4$ is a non-linear function of $P_1$ and $G_{sp}$:

$$P_4 = f_4(P_1, G_{sp}) \quad (5)$$

usefully the above function can be in the form:

$$P_4 = C_1 P_1 + C_2 \quad (6)$$

where $C_1$ and $C_2$ are coefficients determined for a particular amplifier and gain mask.

For purposes of illustration, and not limitation, for particular group of fiber coils, VOA, $G_{ff}$ and gain mask, the following equations may be used by first and second subcontrollers 231 and 232, respectively, to realize a substantially flat gain and low ripple across a chosen operating spectrum:

$$P_2 = -0.0097(P_1)^2 - 0.0856 P_1 - 0.4524; \quad (7)$$

and $$P_3 = b_1(P_1)^2 + b_2 P_1 + b_3 \quad (8)$$

where:

$$b_1 = 0.0002(G_{sp})^2 + 0.0221 G_{sp} + 0.8474, \quad (9)$$

$$b_2 = +0.0004(G_{sp})^3 + 0.0114(G_{sp})^2 + 0.0329 G_{sp} + 0.2753, \quad (10)$$

$$b_3 = +0.0083(G_{sp})^3 - 0.3611(G_{sp})^2 + 5.3612 G_{sp} - 45.097, \quad (11)$$

and $$P_4 = C_1 P_1 + C_2; \quad (12)$$

where:

$$c = -0.009(G_{sp})^2 + 0.0221 G_{sp} + 0.8474, \quad (13)$$

$$c_2 = 12.1381 n(G_{sp}) - 23.342 \quad (14)$$

with $P_2$, $P_3$ and $P_4$ determined, the respective subcontrollers 231 and 232 adjust power at points $T_2$, $T_3$ and $T_4$.

It is of interest to note that the first and second optical pumps 206 and 217, respectively, must stay within a predetermined gain mask (such that shown in FIG. 2(*b*)), which is a graphical representation of lines of constant gain, as is well known to one having ordinary skill in the art. Moreover, as is well known, the pump power is generally proportional to the inversion level of the trivalent erbium in first and second rare-earth doped fibers 208 and 219, respectively. The inversion levels are generally proportional to the gain and the output power. As such, optical pumps 206 and 217 are used to increase the inversion level, and thereby the gain. However, the gain spectrum is different for different inversion levels. In order to attempt to maintain the flat gain across a particular wavelength range, it is useful to have gain flattening filter ($G_{ff}$) 213.

Generally, the gain flattening filter 213 will compensate for the inversion profile of the amplifier. However, because the gain flattening filter 213 is capable of spectrally flattening an EDFA over a limited range of operating conditions dictated by the inversion level of amplifier, the variable optical attenuator 212 is useful in controlling the gain to a particular inversion level. Ultimately, this facilitates a flat response of the gain over a desired wavelength range. It is of interest to note that pumps 206 and 217 alone will not render a flat gain for each channel in a WDM or DWDM optical system. To assure that the output power spectrum is substantially flat as prescribed by the particular set-point, the variable optical attenuator is needed.

As referenced above, the first subcontroller 231 and second subcontroller 232 are relatively fast control loops. To this end, the response time of each of these subcontrollers needs to be as fast as possible, such that the impact of the signal add/drop to surviving channels is minimized. The response time can be expressed in terms of rise time or settling time. Rise time is typically defined as the interval in which the optical output power changes its value form 10% of its steady state value to 90% of its steady state value. Settling time is typically defined as the time interval from the moment when input signal power starts to change until the moment when the output signal power deviations are in the range of approximately −5% to approximately +5% of its final steady state value.

The values of rise time and settling time can vary with varying operating conditions and controller parameters. According to the exemplary embodiment of the present invention presently described, illustrative rise times are in the range of approximately 20 $\mu$s to approximately 0.5 $\mu$s. Settling time is typically higher and illustratively lies in the range of 20 microseconds to approximately few milliseconds. Controller processing times in this range enable a relatively fast response. This ultimately fosters a relatively flat gain spectrum with little tilt and ripple in a short period of time after a change in input signal power (due to channel add/drop) or a change in the gain setpoint.

Figure 3A:
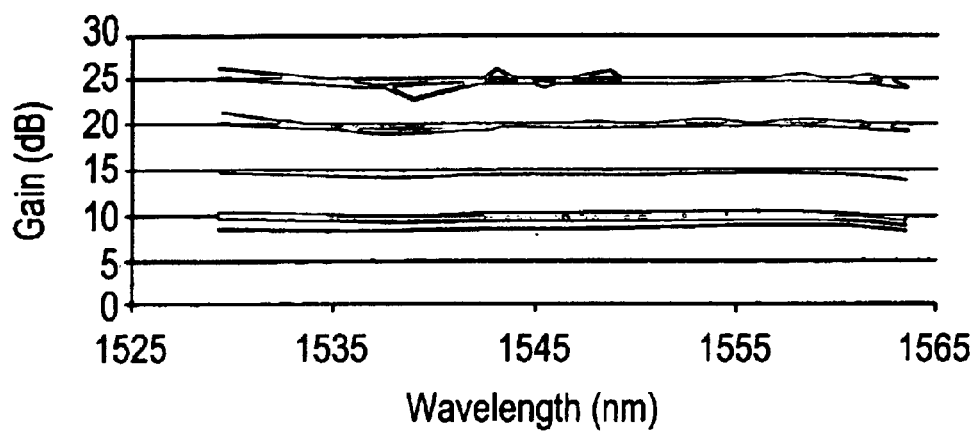
FIG. 3(a) is a graphical representation over an illustrative optical spectrum and an illustrative dynamic range according to an exemplary embodiment of the present invention.

An exemplary gain profile for an optical amplifier according to an illustrative embodiment of the present invention is shown in FIG. 3*a*. In the illustrative gain profile of FIG. 3*a*., the wavelength spectrum is in the range of approximately 1529 nm to approximately 1563 nm. The gain (G) dynamic range approximately 10 dB to approximately 25 dB, while the input power (Pi) range is −19 dBm to +2 dBm. As can be determined from a review of the gain profile, the gain ripple is less than approximately ±1 dB for all gain values. Moreover, the gain tilt, which is defined as the slope of a least square fit to the optical spectrum convoluted with the optical bandwidth, may be determined. As can be appreciated from a review of FIG. 3(*a*), the controller and method of the exemplary embodiment significantly reduces gain tilt.

Figure 3B:
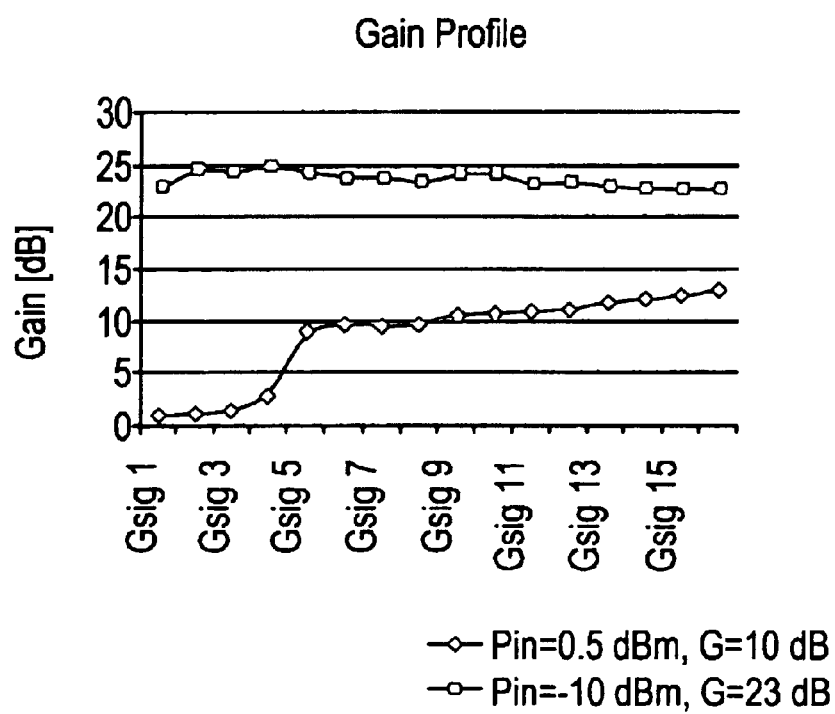
FIG. 3(b) is a graphical view showing the gain profile for a conventional optical amplifier over an operating spectrum of sixteen channels.

For comparative purposes, FIG. 3b shows the gain profile of a conventional optical amplifier over a 16 channel spectrum. The conventional optical amplifier has flat gain at only one operating point, namely for input power of −10 dBm, and gain setpoint of 23 dB. The gain tilt for this operating condition has a low value of 0.37 dB. If the operating condition changes (as in a deployed system), for instance, to Pin=−0.5 dB and the gain setpoint changes to Gsp=10 dB as shown, the gain spectrum will have a large relatively tilt of 11.8 dB.

Figure 4:
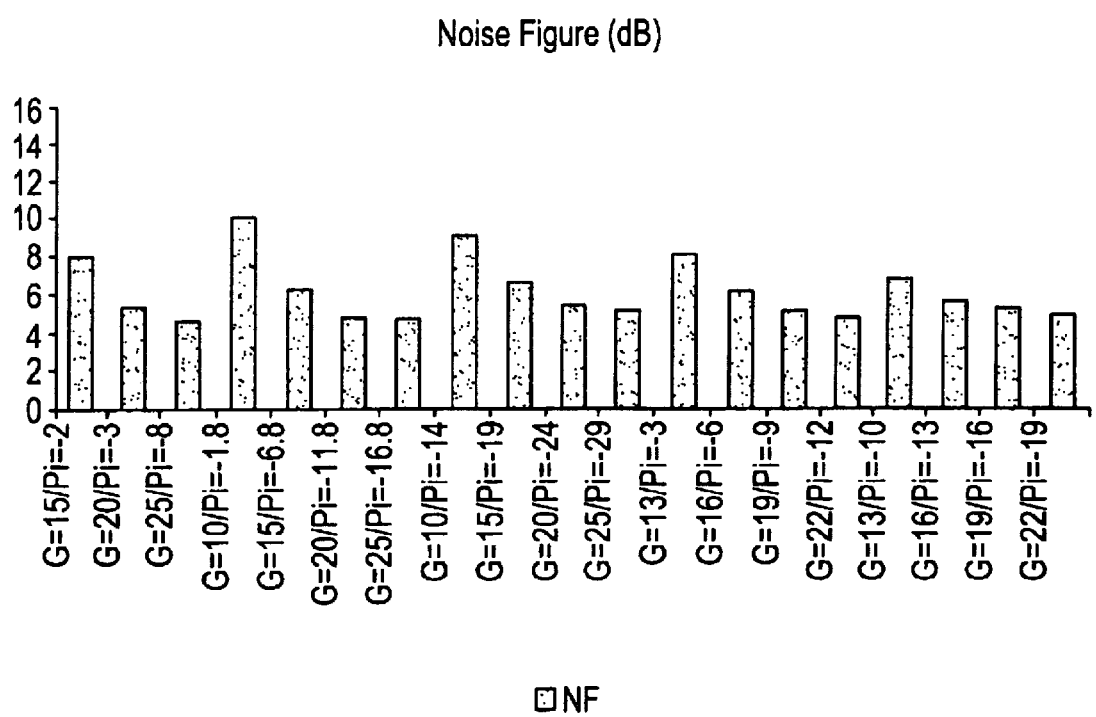
FIG. 4 is a graphical representation of noise figure for various gain set-points according to an exemplary embodiment of the present invention.

Finally, turning to FIG. 4, an illustrative graphical representation of the noise figure for an optical amplifier using a controller and method according to an exemplary embodiment of the present invention is shown. To this end, the noise figure for a variety of gain (G) and input power (Pi) combinations is graphically represented in FIG. 4.

Another illustrative method for controlling optical amplifier 200 is described presently. The method of calculation of set-points for a particular dynamic range may be carried out by the illustrative technique described immediately above. Alternatively, the set-points for output power of first optical amplifier stage 205, second optical amplifier stage 216 and output level from VOA 212 may be stored in a look-up table for various input power levels and desired output levels as described more fully above.

These data may be determined using the illustrative method or via a look-up table. As before, the data may be determined by a combination of the method and a look-up table. With these data from either the method and/or a look-up table, an illustrative method for the controller is as follows:

At time t:

1. Read the optical power $P_1$, $P_2$, $P_3$, $P_4$ at points T1, T2, T3, T4, respectively.

2. Check if the power $P_1$ at points T1 has changed from the last reading, in time instant t−1. If not, return to step 1.

3. Calculate the new gain set-points for the first and second rare-earth doped fibers from the following relations:

$$G_{1sp}(t) = P_2(t) - P_1(t) \quad (15)$$

$$G_{2sp}(t) = P_4(t) - P_3(t) \quad (16)$$

in dB, or $$G_{1sp}(t) = P_2(t)/P_1(t) \quad (17)$$

$$G_{2sp}(t) = P_4(t)/P_3(t) \quad (18)$$

in linear scale.

4. Use a suitable control law to bring the gains of erbium-doped fibers 208 and 219 to desired set-point values $G_{1sp}$, $G_{2sp}$. An illustrative control law for setting the gain set-point values is as described in U.S. patent application Ser. No. (Attorney Docket No.: SP00-116) entitled "Method For Controlling Performance Of Optical Amplifiers" to Gerrish, et al., filed Apr. 13, 2001. The disclosure of the above captioned patent application is specifically incorporated by reference herein.

Illustratively, a settling time is allowed. Again, settling time is defined as the time between the time when the signal started to change to the time when it remains within the range of approximately −5% to approximately +5% of its final steady state value. Again, this settling time is on the order of approximately 20 μsec to approximately 3 ms.

Figure 5:
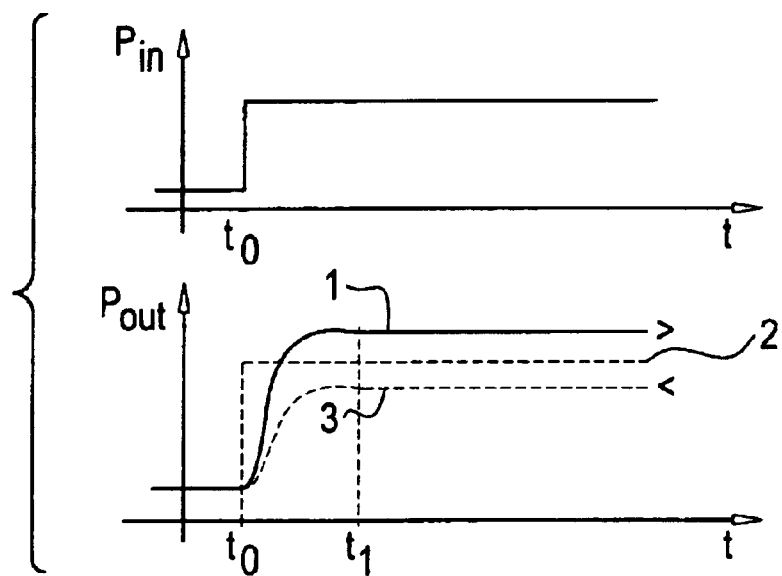
FIG. 5 is a graphical representation of amplifier response to an input signal power increase.

It is of interest to note that during the settling time, two possible scenarios may occur which are shown in FIG. 5, the graph of power-in-versus time and the power-out over time. According to curve 1, at time $t_s$, the total amplifier gain is larger than the required gain set-point value. That is, $G(t_s) = G_{sp} + \Delta G$.

Alternatively, as shown in curve 3, the output signal power is lower than one which corresponds to the total gain set-point value $G_{sp}$. That is, $G(t_s) = G_{sp} - \Delta G$.

Curve 2 represents the required set-point value of the total gain $G_{sp}$. The error in the gain, $\Delta G$, in curves 1 and 3 may exist because the attenuation of the VOA 212 (which has a relatively long response time) has not changed its value. As such, the total gain at a time $t_s$ will be $G(t_s) = G_{sp1} + G_{sp2} + G_{VOA}(t_0) = G_{sp} \pm \Delta G$.

5. Calculate the new value of attenuation of VOA 212, which will drive the gain error to approximately zero and minimize gain tilt. This new level of attenuation, $G_{VOA\_sp}(t_s)$, may be given by $G_{VOA\_sp}(t_s) = P_3(t_s) - P_2(t_s)$ in db; or $G_{VOA\_sp}(t_s) = P_3(t_s)/P_2(t_s)$ in linear scale.

Figure 6:
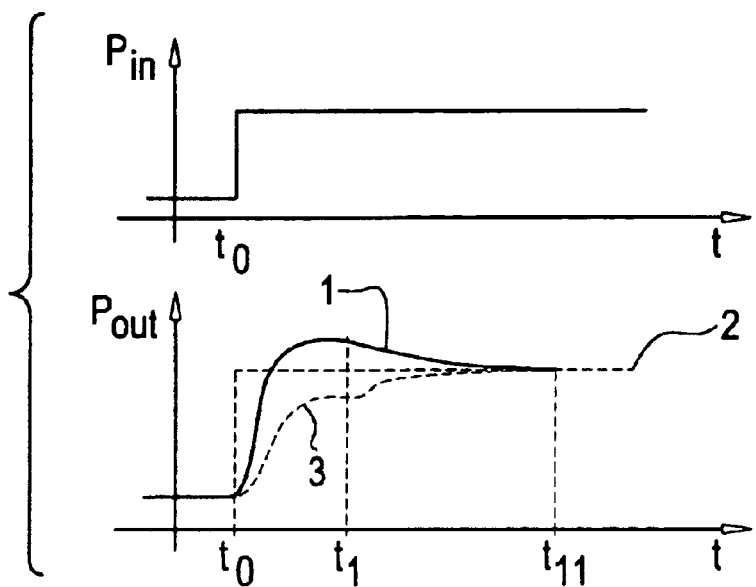
FIG. 6 is a graphical representation of amplifier response to and input signal power increase wherein the action of a variable optical attenuator is incorporated in accordance with an exemplary embodiment of the present invention.

6. Next, VOA controller is activated to bring the gain error to zero, and minimize the gain tilt. The sequence according to the method in step 6 will result in a response of the optical amplifier 200 over time as is shown in FIG. 6, a graph of the power ($P_{in}$) versus time and power out ($P_{out}$) versus time. To this end, at time $t_{ss}$, the transient response is substantially the desired gain set-point value shown in curve 2.

The above described embodiment is merely illustrative of the invention of the present disclosure. The illustrative controller and method has been described in conjunction with a two-stage EDFA variable gain optical amplifier used in WDM applications. As mentioned, the amplifier is an example of an amplifier that could benefit from the controller and method of the exemplary embodiment just described. For example, the amplifier could include more than two amplification stages and the amplifier could be cascaded.

Presently, another exemplary embodiment is described. Again, it is described in conjunction with a two-stage variable gain EDFA amplifier. Again, the present exemplary embodiment may be useful in controlling other amplifiers as referenced above.

EXAMPLE II

Figure 7:
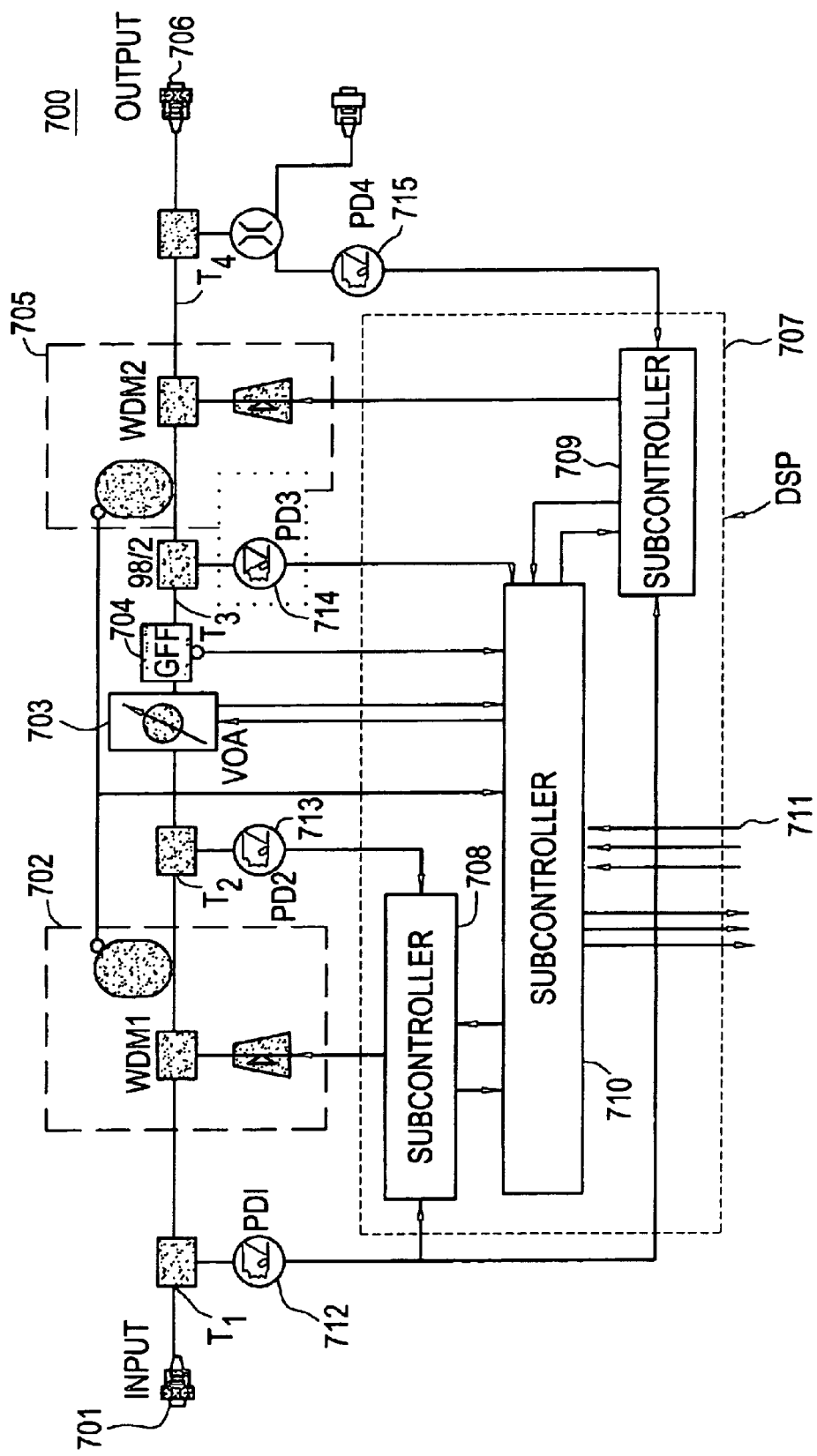
FIG. 7 is a block diagram of an optical amplifier including a controller in accordance with an exemplary embodiment of the present invention.

Turning to FIG. 7, an optical amplifier 700 according to another illustrative embodiment of the present invention is shown. The optical amplifier 700 is similar to that shown in the illustrative embodiment of FIG. 2. To this end, an input port 701 receives an input optical signal from an optical communication system (not shown). A first optical amplifier stage 702 amplifies the input signal. A variable optical attenuator 703 receives a substantial portion of the output from the first optical amplifier stage 702. A gain flattening filter 704 receives the attenuated output from the variable optical attenuator (VOA) 703. A second optical amplifier stage 705 receives the output from the gain flattening filter 704, and the output port 706 delivers the amplified signal to the optical communication system. Portions of the signal at points T1, T2, T3, and T4 are branched off for input to a controller 707. Again, photodetectors (712, 713, 714, 715) are used to convert the signal to an electronic signal. Moreover, the controller 707 may interface to a higher level controller (not shown) via interface 711. As many of the details surrounding the elements immediately described above, are the same as were described in connection with the illustrative embodiment of FIG. 2, certain details will be omitted in the interest of brevity.

A noteworthy difference between the optical amplifier shown in the illustrative embodiment in FIG. 7 compared to that of the illustrative embodiment of FIG. 2 lies in the controller 707. In the illustrative embodiment shown in FIG.

7, the controller 707 includes a first subcontroller 708 and a second subcontroller 709. A third subcontroller 710 is incorporated into the controller 707 to handle controller commands that are less time sensitive. The second subcontroller 709 is included in a "fast" control loop. This "fast" control loop is used to set the overall gain of the optical amplifier 700. To this end, the "fast" control loop ensures that the overall gain (or output power) is equal to its set-point value very quickly. This rapid gain set-point adjustment may be achieved through the illustrative method described immediately below.

The following method may be used to control the optical amplifier 700 with controller 707. Of course, this method is merely illustrative, and other methods within the purview of one having ordinary skill in the art may be used control the optical amplifier 700 with the controller 707.

Illustrative Method

1. At time t detect the optical signal powers $P_1$, $P_2$, $P_3$, P4 at points at T1, T2, T3, and T4, respectively.
2. Check if the power $P_1$ in terminal T1 has changed from the last reading, in time instant t-1. If not, return to step 1.
3. Calculate new gain set-point for first amplifier stage using look-up table or "Method For Calculation Of Set-Points For Given Dynamic Range" described above; and $$G_{1sp}(t)=P_2(t)-P_1(t) \text{ in dB, or} \quad (19)$$

$$G_{1sp}(t)=P_2(t)/P_1(t) \text{ in linear scale} \quad (20)$$

4. Apply control law (illustratively the control law as recited in U.S. patent application "Method for Controlling Performance Of Optical Amplifiers," referenced above) for control loop which includes first subcontroller 708, such that the gain of the first optical amplifier state is equal to $G_{1sp}$.
5. Apply control law of step 4 for "fast" loop that includes second subcontroller 709, such that the overall gain of optical amplifier 700 is equal to set-point gain $G_{sp}$. After settling time, $t_s$, the total gain $G(t_s)$ (or output power) of optical amplifier 700 will be equal to its set-point value $G_{sp}$. (see transient performance of controller 707 as graphically represented in FIG. 8(b). In this particular illustrative embodiment, the total gain may be represented as:

$$G(t)=P_4(t)-P_1(t) \text{ in dB; or} \quad (21)$$

$$G(t)=P_4(t)/P_1(t) \text{ in linear scale} \quad (22)$$

However, it is of interest to note that the level of attenuation by variable optical attenuator 703 has not been changed since time, $t_0$. As the variable optical attenuator (VOA) is particularly useful in elimination of gain tilt and ripple, there may in fact be gain tilt present at a time, $t_s$.

6. Next, the values of VOA attenuation $$G_{VOA\_sp}(t_s)=P_3(t_s)-P_2(t_s) \text{ in dB; or} \quad (23)$$

$$G_{VOA\_sp}(t_s)=P_3(t_s)/P_2(t_s) \text{ in linear scale} \quad (24)$$

necessary to assure gain tilt is substantially zero. Again, the required values of attenuations may be determined from a look-up table, or may be determined per "Method For Calculation Of Setpoints For Given Dynamic Range" described in detail above.

7. Utilize control law, such as that described in the above captioned patent application "Method For Controlling Performance Of Optical Amplifiers," to bring the level of attenuation of VOA 703 to its required set-point value.

The transient response time is improved from on the order of approximately hundreds of milliseconds in amplifiers incorporating conventional controllers, to a transient response time in the range of approximately 0.02 ms to approximately 2.0 ms, according to the illustrative embodiment of the present invention. To this end, the time at which steady state ($t_{ss}$) when the power divergence of the remnant (surviving) signal is reduced substantially to zero is improved by adjusting the pump(s) to values determined by the illustrative method discussed above. This is shown clearly in FIGS. 8(a)–9(b).

Figure 8A:
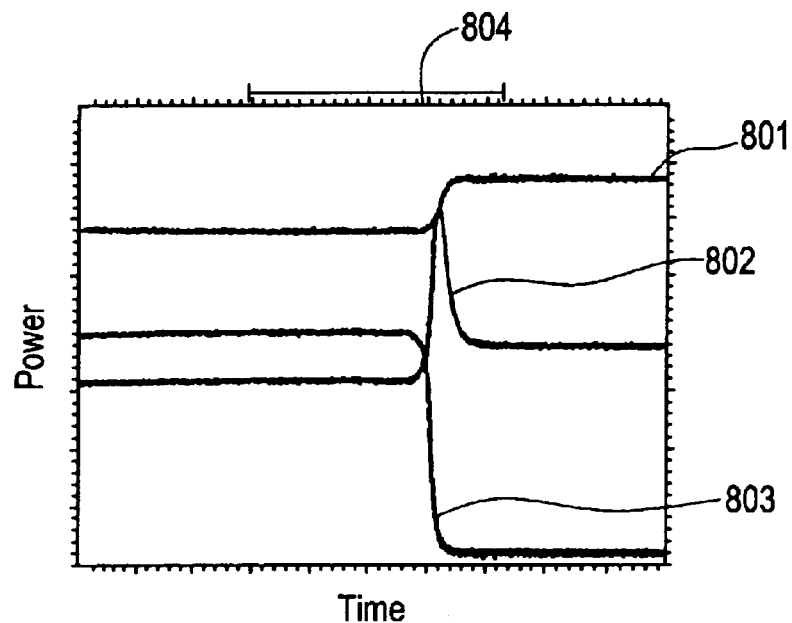
FIG. 8(a) is a graphical representation of transient performance of conventional optical amplifier when channels are added.

FIG. 8(a) shows the transient response of a conventional amplifier when 32 channels are added to one existing channel and there is no transient control present. As can be seen, at point 804, the channels are added. The total input power 801 increases sharply, the total output power increases sharply, and the surviving channel power 803 drops significantly. Thus, the surviving channel is adversely impacted by the addition of channels to the system.

Figure 8B:
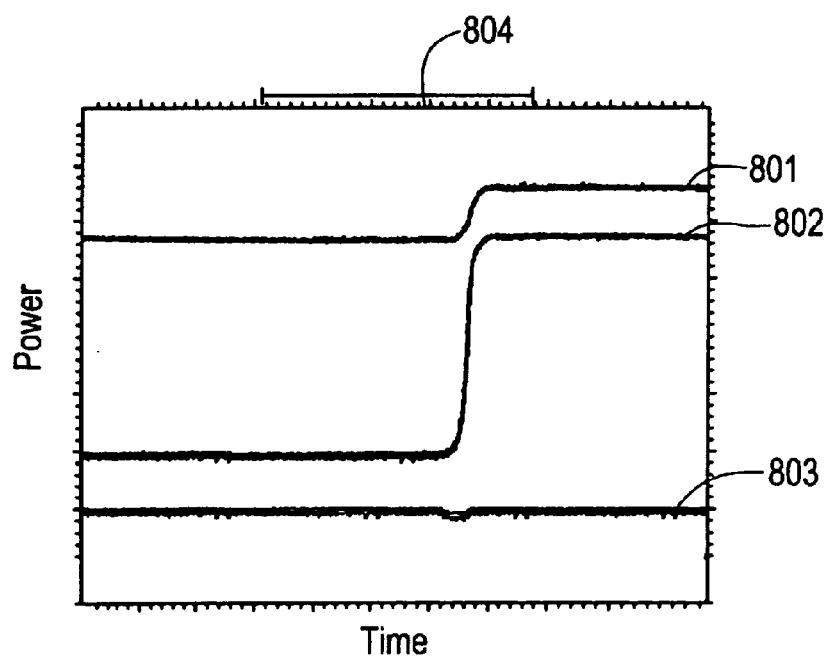
FIG. 8(b) is a graphical representation of transient performance of an optical amplifier when channels are added in accordance with an exemplary embodiment of the present invention.

FIG. 8(b) shows the transient response when 32 channels are added (point 804) to one channel in an optical amplifier incorporating a controller and method according to an illustrative embodiment of the present invention. The gain set point ($G_{sp}$) is illustratively 20 dB. As can be seen, the total input power 801 increases; the total output power 802 increases; but, the surviving channel power 803 experiences substantially no change in gain. Advantageously, the surviving channel is minimally impacted by the addition of channels. Similar results are obtained for signal drop.

Figure 9A:
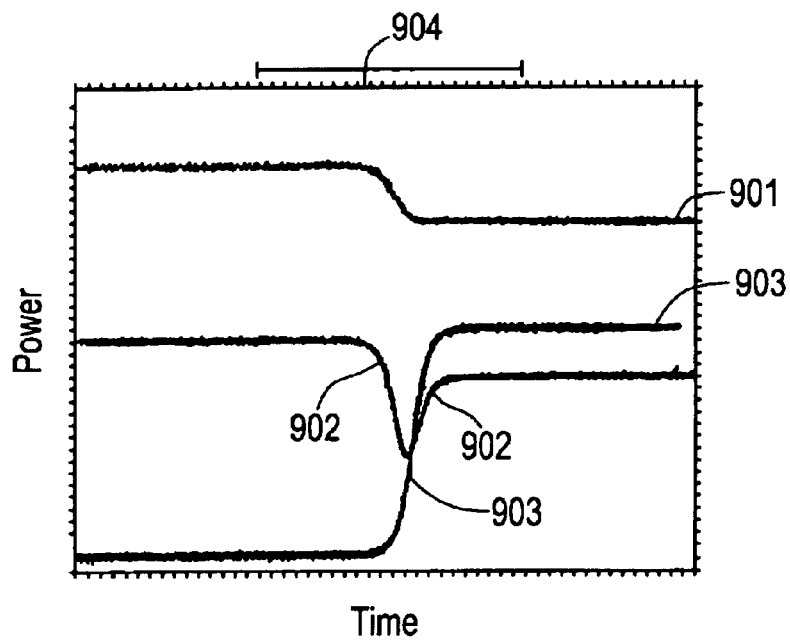
FIG. 9(a) is a graphical representation of transient performance of conventional optical amplifier when channels are dropped.

FIG. 9(a) shows the transient response of a conventional amplifier when 32 out of 33 channels are dropped and the automatic gain control is not present in the amplifier. At point 904, the channels are dropped. The total input power 901 drops as does the total output power 902. However, the surviving channel power 903 sharply increases. Of course, this is not desirable.

Figure 9B:
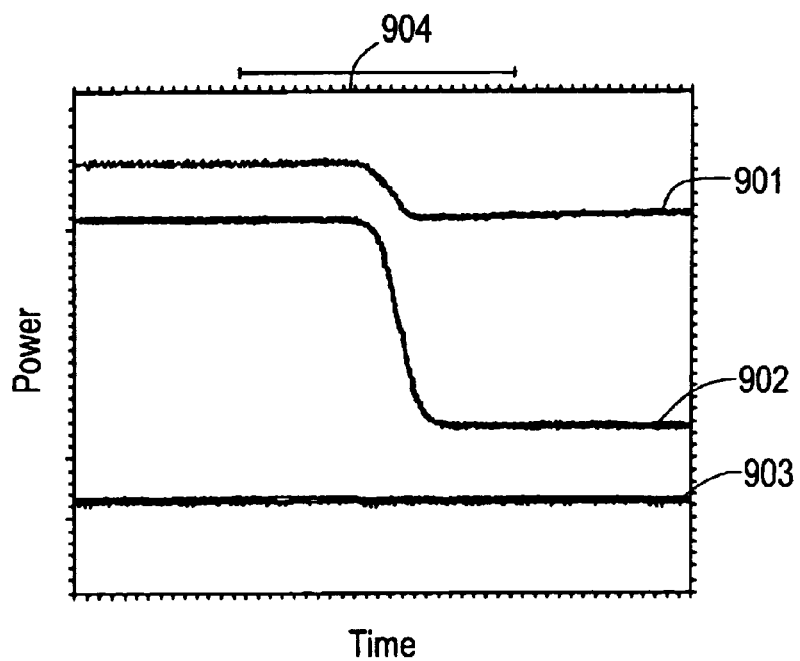
FIG. 9(b) is a graphical representation of transient performance of an optical amplifier when channels are dropped in accordance with an exemplary embodiment of the present invention.

Contrastingly FIG. 9(b) shows the transient response of an optical amplifier incorporating a controller according to an illustrative embodiment of the present invention. The gain set point ($G_{sp}$) is illustratively 20 dB. As can be seen, at point 904 when the channels are dropped, the total input power 901 and total output power 902 drop. However, there is a very little impact of signal drop on surviving channels as the surviving channel signal power 903 remains substantially unchanged.

It is of interest to note that a gain flattening filter is usefully incorporated into the illustrative embodiment. The gain flattening filter 704 is selected to take into account and provide an average performance over a large range of input power, gain set point and wavelength conditions. Moreover, the transient response time of the amplifier may also depend on the type of variable optical attenuator (VOA) 703 that is used. Clearly, a VOA having a faster response time will lead to shorter intervals at which steady state is reached. The VOA actively suppresses transients generated in the amplifier by acting as a mechanism to either increase or decrease the inversion level in the active medium (such as rare-earth doped fiber, and in this case erbium doped fiber) by working in conjunction with the pumps. The VOA would be used to impact the signal powers that also dictate the inversion level in the rare earth doped fibers.

For purposes of illustration, an electronic block diagram of an illustrative controller is presently described. The controller may be used to control the optical amplifiers described in the illustrative embodiments above. Alternatively, the controller may be used in other optical amplifiers.

Illustrative Controller

Figure 10:
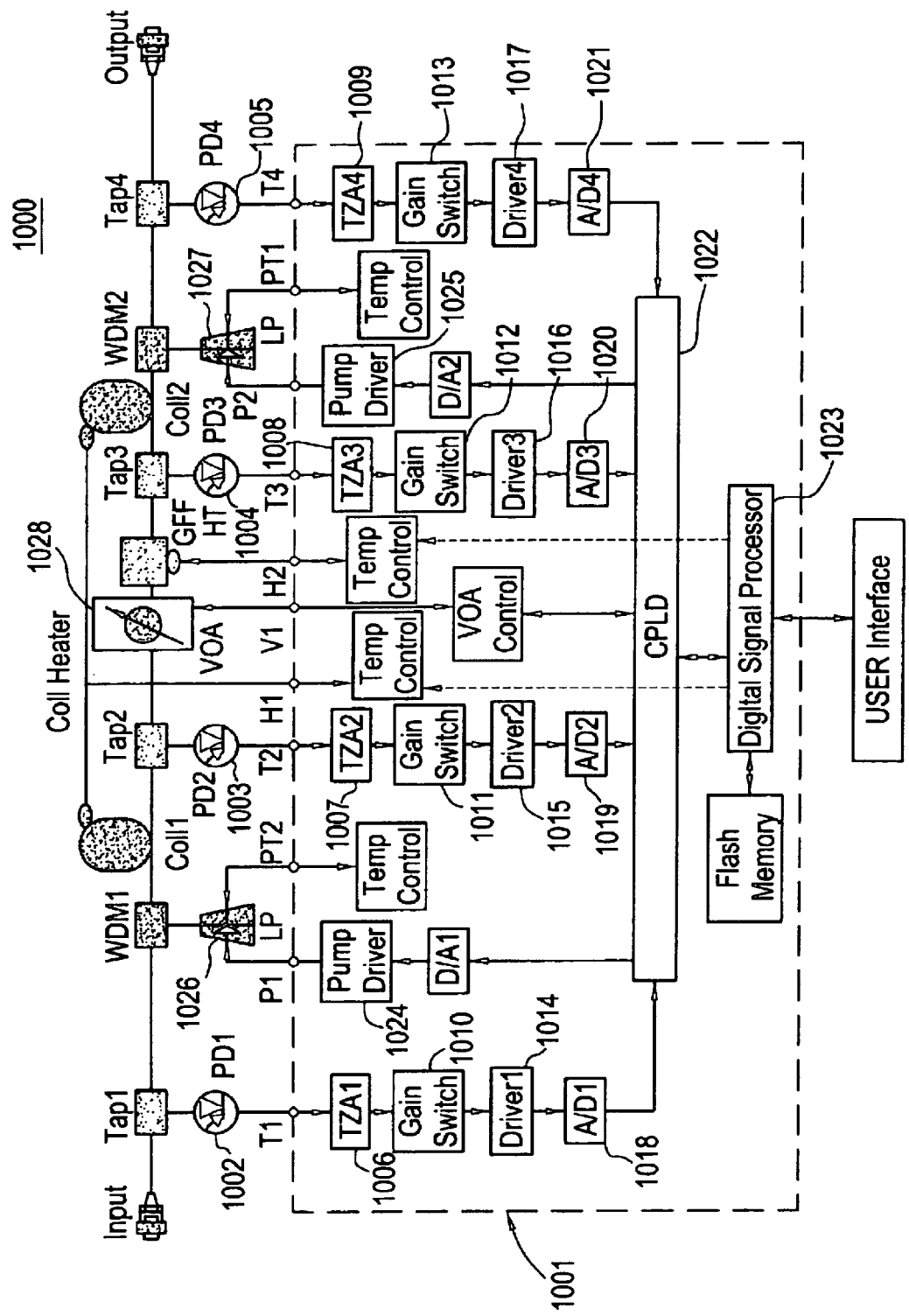
FIG. 10 is a block diagram of a controller in accordance with an exemplary embodiment of the present invention.

FIG. 10 shows an optical amplifier 1000 including electronic control circuit 1101 according to an illustrative embodiment of the present invention. In this exemplary embodiment the electronic control circuit 1001 senses the optical signal converted to electrical signal by four photodetectors 1002, 1003, 1004 and 1005 at four points: at amplifier input (T1), after the first amplifier stage (T2), before input to second stage (T3) and at amplifier output (T4), respectively.

Electrical signals at these four points are amplified by respective transimpedance amplifiers 1006, 1007, 1008 and 1009. These signals still may be weak, especially for low input optical signal power. If this is the case these electrical signals will be amplified by respective electronic gain switches 1010, 1011, 1012, 1013. Electronic gain switchs 1010, 1011, 1012, 1013 illustratively can have one or more discrete values of gain, for instance 1, 4, 16, 32. The smaller the optical signal power, the larger the switch gain. Gain of the electronic gain switch is controlled by the illustrative control methods described above.

After gain switch there may be respective driver circuits 1014, 1015, 1016, 1017 for shifting the electrical signal to the range suitable for analog-to-digital (A/D) conversion at respective A/D converters 1018, 1019, 1020, 1021. A/D converters 1018, 1019, 1020, 1021 transform the signal representing optical power from analog to a digital form. This digital signal is preprocessed by a digital processor 1022. In this illustrative example, a Complex Programmable Logic Device (CPLD) is utilized, but it can be other type of processor.

Preprocessed digital signal(s) representing optical power (s) is (are) sent to a processing unit 1023, which is a relatively complex processing unit. In this illustrative example a Digital Signal Processor DSP (for instance Motorola 56311) can be used, but is not limited to this particular processing unit.

Information on optical powers coming into digital processor 1023 is used to calculate the necessary parameters to be controlled (for example average optical signal gain, optical signal power) and to compare it with desired (set-point values of gain or output power). The error signal calculated as a result of this comparison is utilized by the illustrative control method, which calculates the control signal for the pump drivers 1024 and 1025. These control values are sent to processing unit 1023, converted from digital back to analog form by digital-to-analog converters 101 and 1012; and amplified by the pump drivers 1024 and 1025, which will control the power of laser pumps 1026 and 1027. Variable optical attenuator VOA is controlled in a similar way.

Optical performance of the amplifier may depend also on environmental parameters, such as temperature. Temperature sensitive components of the amplifier may be the pump lasers, erbium doped fiber coils and gain flattening filter. The temperature of these components can be controlled by the same processing units (CPLD and DSP) or it can be done by analog electronic circuits. Each component which has temperature control needs to have a temperature sensor, which will convert the temperature information of that specific component into electrical signal.

The invention being thus described, it would be obvious that the same may be varied in many ways by one of ordinary skill in the art having had the benefit of the present disclosure. Such variations are not regarded as a departure from the spirit and scope of the invention, and such modifications as would be obvious to one skilled in the art are intended to be included within the scope of the following claims and their legal equivalents.

We claim:

1. A method for controlling an optical amplifier, the method comprising:

inputting a set-point to a controller, which includes at least one subcontroller;

receiving a portion of an input signal at said controller;

receiving a portion of an output signal from a first amplifier stage;

receiving a portion of an output signal from an attenuation stage at said controller at said controller;

receiving a portion of an output signal from a second amplifier stage; and sending commands from said controller to said first amplifier stage, sending commands from said controller to said second amplifier stage, and sending commands from said controller to said attenuation stage, wherein said commands from said controller are based on said received portions, and said commands from said controller substantially maintains said set-point.

2. A method as recited in claim 1, wherein said method further comprises specifying a desired control mode.

3. A method as recited in claim 2, wherein said control mode is chosen from the group consisting essentially of gain control mode, output power control mode and pump current control mode.

4. A method as recited in claim 1, wherein said set-point is chosen from the group consisting essentially of gain set-point ($G_{sp}$), output power set-point ($P_{OUTsp}$) and pump current set-point ($I_{sp}$).

5. A method as recited in claim 1, wherein said adjusting said first amplifier stage further comprises determining a first amplifier stage set-point value for said first amplifier stage and commanding said first amplifier stage to achieve said first amplifier set-point value.

6. A method as recited in claim 1, wherein said adjusting said second amplifier stage further comprises determining a second amplifier stage set-point value for said first amplifier stage and commanding said second amplifier stage to achieve said second amplifier set-point value.

7. A method as recited in claim 1, wherein said adjusting said attenuation stage further comprises determining an attenuation stage set-point value for said attenuation stage and commanding said attenuation stage to achieve said attenuation set-point value.

8. A method as recited in claim 5, wherein said determining said first amplifier stage set-point value further comprises retrieving said first amplifier stage set-point value from a look-up table.

9. A method as recited in claim 6, wherein said determining said second amplifier stage set-point value further comprises retrieving said second amplifier stage set-point value from a look-up table.

10. A method as recited in claim 7, wherein said determining said attenuation amplifier stage set-point value further comprises retrieving said attenuation stage set-point value from a look-up table.

11. A method as recited in claim 5, wherein said determining said first amplifier stage set-point value further comprises calculating said first amplifier stage set-point value based upon an input signal power.

12. A method as recited in claim 6, wherein said determining said second amplifier stage set-point value further comprises calculating said second amplifier stage set-point value based upon said first amplifier stage set-point value and said set-point.

13. A method as recited in claim 7, wherein said determining said attenuation stage set-point value further comprises calculating said attenuation stage set-point value based said upon said first amplifier input stage set-point value and said set-point.

14. A method as recited in claim 6, wherein said adjusting said second amplifier stage further comprises controlling a pump of said second amplifier stage.

15. A method as recited in claim 1, wherein said attenuation stage further comprises a variable optical attenuator.

16. A method as recited in claim 1, wherein a gain flattening filter is disposed between said attenuation stage and said amplifier stage.

17. A method as recited in claim 1, wherein the optical amplifier operates with gain tilt in the range of approximately −1 dB to approximately +1 dB over a wavelength range of approximately 1528 nm to approximately 1565 nm.

18. A method as recited in claim 17, wherein the optical amplifier further operates over a dynamic range of approximately 10 dB to approximately 25 dB average signal gain, for total input power range of approximately −29 dBm to approximately +7 dBm and total output power range of approximately −4 dBm to approximately +17 dBm.

19. A method as recited in claim 5, wherein said determining said first amplifier stage set-point further comprises a combination of calculating and retrieving data from a look-up table.

20. A method as recited in claim 6, wherein said determining said second amplifier stage set-point further comprises a combination of calculating and retrieving data from a look-up table.

21. A method as recited in claim 7, wherein said determining said attenuation stage set-point further comprises a combination of calculating and retrieving data from a look-up table.

22. A method as recited in claim 1, wherein the method further comprises compensating for amplified spontaneous emission present.

23. An optical amplifier, comprising:
A controller, which includes at least one subcontroller, and which receives a portion of input signal, a portion of an output signal from a first amplifier stage, a portion of an output signal from an attenuation stage, and a portion of an output signal from a second amplifier stage, and wherein said controller adjusts said first amplifier stage, said attenuation stage and said second amplifier stage based on said received portions.

24. An optical amplifier as recited in claim 23, wherein said controller operates in a desired control mode.

25. An optical amplifier as recited in claim 24, wherein said desired control mode is chosen from the group consisting essentially of gain control mode, output power control mode, and pump current control mode.

26. An optical amplifier as recited in claim 23, wherein said controller inputs a set-point to the optical amplifier.

27. A controller as recited in claim 26, wherein said set-point is chosen from the group consisting essentially of gain set-point ($G_{sp}$), output power set-point ($P_{sp}$), and pump current set-point ($I_{sp}$).

28. An optical amplifier as recited in claim 23, wherein said at least one subcontroller further comprises a first subcontroller, a second subcontroller, and a third subcontroller.

29. An optical amplifier as recited in claim 28, wherein said first subcontroller controls said first amplifier stage, said second subcontroller controls said second amplifier stage, and said third subcontroller controller said attenuation stage.

30. An optical amplifier as recited in claim 23, wherein said second subcontroller controls said first subcontroller and said second amplifier stage.

31. An optical amplifier as recited in claim 30, wherein said first subcontroller controls said first amplifier stage.

32. An optical amplifier as recited in claim 23, wherein said second subcontroller controls said first subcontroller and said second amplifier stage.

33. An optical amplifier as recited in claim 32, wherein said first subcontroller adjusts said first amplifier stage based on commands from said second subcontroller.

34. An optical amplifier as recited in claim 23, further comprising a gain flattening filter disposed between said attenuation stage and said second amplifier stage.

35. A method for controlling an optical amplifier, the method comprising:
inputting a set-point to a controller, which includes at least one subcontroller;
receiving a portion of an output signal at said controller from an amplifier stage;
receiving a portion of an output signal from said amplifier stage at said controller; and sending commands from said controller to said amplifier stage to adjust said amplifier stage, wherein said commands from said controller are based on said received portion, and said commands from said controller substantially maintain said set point.

36. A method as recited in claim 35, wherein said method further comprises specifying a desired control mode.

37. A method as recited in claim 36, wherein said control mode is chosen from the group consisting essentially of gain control mode, output power control mode and pump current control mode.

38. A method as recited in claim 35, wherein said set-point is chosen from the group consisting essentially of gain set-point ($G_{sp}$), output power, set-point ($P_{OUTsp}$) and pump current set-point $I_{sp}$.

39. A method as recited in claim 1, wherein said adjusting said amplifier stage further comprises determining an amplifier stage set-point value for said amplifier stage and commanding said amplifier stage to achieve said amplifier set-point value.

40. A method as recited in claim 39, wherein said determining said first amplifier stage set-point value further comprises retrieving said first amplifier stage set-point value from a look-up table.

41. A method as recited in claim 39, wherein said determining said amplifier stage set-point value further comprises calculating said amplifier stage set-point value based upon an input signal power.

42. An optical amplifier, comprising:
a controller, which includes at least one subcontroller, and which receives a portion of input signal, a portion of an output signal from an amplifier stage, and which adjusts said amplifier stage based on said received portions, wherein the optical amplifier does not include a gain-flattening filter in a signal path of the amplifier.

43. An optical amplifier as recited in claim 42, wherein said controller operates in a desired control mode.

44. An optical amplifier as recited in claim 43, wherein said control mode is chosen from the group consisting essentially of gain control mode, output power control mode and pump current control mode.

45. An optical amplifier as recited in claim 43, wherein the optical amplifier operates at a set-point that is chosen from the group consisting essentially of gain set-point ($G_{sp}$), output power, set-point ($P_{OUTsp}$) and pump current set-point $I_{sp}$.

46. An optical amplifier as recited in claim 42, wherein said controller adjusts an amplifier stage set-point value for said amplifier stage and commands said amplifier stage to achieve said amplifier set-point value.

47. An optical amplifier as recited in claim 42, further comprising a final stage, which is coupled ultimately to said amplifier stage, wherein there is no variable optical attenuator connected between said final stage and an output of the optical amplifier.

* * * * *